(12) United States Patent
Schumacher et al.

(10) Patent No.: US 7,370,463 B2
(45) Date of Patent: May 13, 2008

(54) REEL

(75) Inventors: Gustav Schumacher, Gartenstrasse 8, Eichelhardt (DE) 57612; Friedrich-Wilhelm Schumacher, Eichelhardt (DE)

(73) Assignee: Gustav Schumacher (DE)

( * ) Notice: Subject to any disclaimer, the term of this patent is extended or adjusted under 35 U.S.C. 154(b) by 0 days.

(21) Appl. No.: 10/921,430

(22) Filed: Aug. 19, 2004

(65) Prior Publication Data

US 2005/0044840 A1 Mar. 3, 2005

(30) Foreign Application Priority Data

Aug. 20, 2003 (DE) ................ 103 38 864

(51) Int. Cl.
*A01D 89/00* (2006.01)
(52) U.S. Cl. .............. 56/364; 56/14.4; 56/220
(58) Field of Classification Search .......... 56/220, 56/57, 58, 64, 74, 77, 81, 86, 91, 92, 96, 56/364, 400, 14.3, 14.4, 17.3
See application file for complete search history.

(56) References Cited

U.S. PATENT DOCUMENTS

| 640,044 | A | * | 12/1899 | Stewart | 56/220 |
|---|---|---|---|---|---|
| 1,909,324 | A | * | 5/1933 | Wendler | 366/321 |
| 2,041,132 | A | * | 5/1936 | Johnson | 285/112 |
| 2,145,467 | A | * | 1/1939 | Waddell | 56/7 |
| 2,335,112 | A | * | 11/1943 | Fulks | 172/241 |
| 2,624,168 | A | * | 1/1953 | Clemson | 56/249 |
| 3,584,445 | A | * | 6/1971 | Hubbard | 56/220 |
| 3,771,299 | A |  | 11/1973 | Gradwohl et al. |  |
| 4,067,177 | A |  | 1/1978 | Tout |  |
| 4,068,454 | A | * | 1/1978 | Webb | 56/220 |
| 5,007,235 | A |  | 4/1991 | Nickel et al. |  |
| 5,230,537 | A | * | 7/1993 | Newman | 285/112 |
| 6,158,571 | A | * | 12/2000 | Gosa | 198/613 |
| 6,442,918 | B1 |  | 9/2002 | Fox |  |
| 2003/0126848 | A1 |  | 7/2003 | Bickel |  |

FOREIGN PATENT DOCUMENTS

| DE | 111 768 | 3/1975 |
|---|---|---|
| DE | 199 56 431 A1 | 8/2000 |

* cited by examiner

*Primary Examiner*—Thomas B. Will
*Assistant Examiner*—Alicia Torres
(74) *Attorney, Agent, or Firm*—Harness, Dickey & Pierce, P.L.C.

(57) ABSTRACT

A reel for a cutting system for harvesting machines has a central carrier body (1) defining a longitudinal axis (2). The reel central carrier body has an outer face (7) between a first axial end A and a second axial end B. Several support elements (20) are arranged along the longitudinal axis (2) on the carrier body (1) distanced from each other and supporting tine carriers (21) arranged on a circle around the longitudinal axis (2). Clamping sleeves (3) have inner faces (6) adapted to the outer face (7) of the carrier body (1). The clamping sleeves enclose the outer face (7) in a circumferential direction and leave an axially extending slot (8) between a first circumferential end (9) and a second circumferential end (10), which ends delimit the slot (8). The support elements (20) are mounted on the clamping sleeves. A clamping mechanism (18) is arranged on each of the clamping sleeves (3) close to the first circumferential end (9) and the second circumferential end (10) of the clamping sleeve (3). The clamping mechanism enables the clamping sleeves (3) to be tightened against the outer face (7) of the carrier body (1).

11 Claims, 6 Drawing Sheets

REEL

CROSS-REFERENCE TO RELATED APPLICATIONS

This application claims priority to German Patent Application Nos. 10338864.8 filed Aug. 20, 2003, which application is herein expressly incorporated by reference.

FIELD OF THE INVENTION

The invention relates to a reel for cutting systems of harvesting machines.

BACKGROUND OF THE INVENTION

The reels usually include a multiplicity of support elements. The support elements radially extend to a central carrier body in the form of a tube, and are circumferentially distributed around and connected to the central carrier body. The central carrier body is rotationally accommodated in bearing arms. Depending on the width of the cutting table of a cutting system of a harvesting machine, the reel can have a length of 10 m and more. The object of the reel is to guide the harvested goods to the cutter bar, to pull the cut harvested goods away from the cutter bar and to guide the same to the further devices of the machine for further processing.

A reel for a cutter system of a harvesting machine is, for example, disclosed in U.S. Pat. No. 5,007,235. Support discs are non-rotationally fixed along the longitudinal axis of the tubular central carrier body in a distributed manner. Each support disc is provided with five support arms. The arms are distributedly arranged around the circumference and extend essentially radially to the outside away from the longitudinal axis. The arms are connected to the outer circumference of the discs. The arms on the support discs are aligned in an axial direction parallel to the longitudinal axis and support tine carriers in bearings. These tine carriers are provided, respectively, with tines.

The reel described in U.S. Pat. No. 3,771,299 includes triangular support elements rigidly attached on the tubular carrier body. The elements are distanced from each other along the longitudinal axis.

DE 199 56 431 A1 describes a reel where the central carrier body is constructed of a multitude of tubular segments, formed, respectively, of halves of tube segments. Tine carriers are mounted star-like in the area of the abutment points of the tube segments on the arms. The tine carriers are eccentrically supported to the longitudinal axis.

The rigid welded connection of the support elements to the central carrier body has a disadvantageous effect on the strength of the carrier body. The welded connection causes a structural change in the tubular carrier body, which carrier body is due to weight reasons, thin-walled. The stability of the carrier body is, because of this, negatively influenced. A further disadvantage is that expensive devices need to be provided during the manufacturing process to hold the support elements in the correct position to connect to the carrier body. Furthermore, since the length of the carrier tube has to be accurately adapted to the reel over the complete length of the reel, which is long, tight tolerances need to be maintained.

DD 111 768 describes a reel for harvesting machines with a central carrier body. The carrier body is made depending on the working width of one or a multitude of tube portions. The individual tube portions can be connected to each other by flanges mounted on their ends and by screws. Also, flanges attach the reel star to the tube portions of the central carrier body.

SUMMARY OF THE INVENTION

According to the invention, a reel is provided which can be manufactured in a simple manner. Also, the positioning and attachment of the support elements on the carrier body can be easily achieved. Further, a later exchange of components, due to repairs, is simplified.

The invention provides a reel for a cutting system of harvesting machines comprising a central carrier body defining a longitudinal axis. An outer face extends over a length of the carrier body corresponding to the reel width between a first axial end and a second axial end. A multiplicity of support elements are distanced to each other along the longitudinal axis on the carrier body. The support elements support tine carriers. The support elements are distributed about a circle around the longitudinal axis. Clamping units enclose at least partially the outer face of the carrier body in the circumferential direction. The clamping units are frictionally fastened on the outer face, and support, respectively, at least one support element.

In this arrangement, the clamping units can be positioned in an easy manner along the longitudinal axis of the central carrier body. Since the clamping units use a clamping mechanism, weakening of the central carrier body is not produced by welding seams. The carrier body, regularly formed as a thin-walled tube, is even reinforced by the clamping units. The exchange of support elements is simplified. A later new alignment can be carried out, when due to a collision or any other influence from the outside, a change of the position of the components is produced. If carrier bodies, which have a circular cylindrical outer face, are used, an easy circumferential alignment around the longitudinal axis as well as in the direction of the longitudinal axis can be achieved. No special clamping devices are necessary to hold the clamping units during mounting on the carrier body.

According to the invention, different types of reels can be manufactured which have different lengths. Correspondingly, the support elements can be mounted along the longitudinal axis in a simple manner by the clamping units. For the individual types of reels the clamping units do not require specific manufacturing devices as for support elements according to the related art which connect the support elements directly to the carrier body. In total, a larger variability is achieved. Thus, reels can be manufactured in a simple manner. The support elements which follow each other along the longitudinal axis are arranged and distanced from each other. The support elements form, in the direction around the longitudinal axis, support points distributed around the circumference. Accordingly, the clamping units can be mounted in an angularly off-set manner to each other on the circumference of the carrier body around the longitudinal axis without otherwise changing the structure.

The carrier body has, preferably, a circular cylindrical tube cross-section. However, other cross-sectional forms are possible which deviate from the circle. For example, a polygonal profile (multiple cornered profile) can be provided. The design as a circular cylindrical tube has the advantage, that with slight deviations, a circumferential alignment around the longitudinal axis, for the adjustment of the support elements or for the alignment of all the support elements to each other, can be carried out so such that the clamping units are rotationally adjusted on the carrier body for the alignment.

It is possible to detachably mount the support elements on the clamping units, for example, by screws. However, the support elements can also be directly rigidly connected to the respective clamping sleeve by a welded connection. This, however, does not negatively influence the support strength of the tubular central carrier body. Further, each clamping unit can also carry more than one support element.

A bearing journal, centered on the longitudinal axis, is arranged to that clamping unit or that support element connected to a clamping unit, which is mounted close to one of the axial ends of the carrier body. Thus, for cutting the central carrier body to length, no specific tight tolerances need to be maintained. The adjustment of the total length can be achieved such that the clamping units, provided on the ends of the carrier body, can be adjusted in the direction of the longitudinal axis before they are clamped on the carrier body. The length adjustment can be achieved very accurately. Also, exact machining is not necessary.

In a first embodiment according to the invention, the clamping units comprise a clamping sleeve with an inner face adapted to the outer face of the carrier body. The inner face encloses the outer face of the carrier body in the circumferential direction. The clamping sleeve is split by a slot forming a first circumferential end and a second circumferential end delimiting the slot. A clamping mechanism is arranged to each clamping sleeve. The clamping mechanism engages closely to the first circumferential end and the second circumferential end of the clamping sleeve. The clamping mechanism enables the clamping sleeve to be clamped against the outer face of the carrier body.

In a second embodiment according to the invention, the clamping units, respectively, comprise clamping segments. The clamping segments inner faces are adapted to the outer face of the carrier body and enclose the outer face in the circumferential direction by leaving a slot, so that the circumferential ends delimit the slots. A portion of at least one support element is mounted on the clamping segments A clamping mechanism is arranged to the clamping segments. A clamping mechanism is arranged on the clamping segments. The clamping mechanism engages the clamping segments close to the circumferential ends. Thus, the clamping segments can be clamped, forming a ring, against the outer face of the carrier body.

Thus, it is advantageous during a repair that only for the respectively damaged unit disassembly has to be carried out, as a radial assembly or disassembly towards the longitudinal axis is possible. The further clamping units can stay in their specific position.

In an embodiment of the invention, each clamping sleeve and each clamping segment have at least two projecting attachment portions extending radially from the longitudinal axis. The portions extend, respectively, over a partial circumference of the clamping sleeve or over the circumference of the clamping segments. The attachment portions have through bores at the circumference of the reel. The through bores are distributed parallel to the longitudinal axis. Alternatively, studs with threads attach a support element or a portion of the same. These attachment portions serve, respectively, for the detachable attachment of the support elements.

In an embodiment of the invention, bent lungs are arranged close to the circumferential ends of the clamping sleeves or of the clamping segments. The bent lug portions oppose each other and have, respectively, at least one through bore to pass a clamping screw. By tightening the clamping screw, the clamping sleeve or .the clamping segments, respectively, are pressed tightly to the outer face of the carrier body. Thus, a high frictional connection is produced to the outer face.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Firstly, embodiments with clamping units, comprising clamping sleeves, are described in connection with FIGS. 1 to 5.

Figure 1:
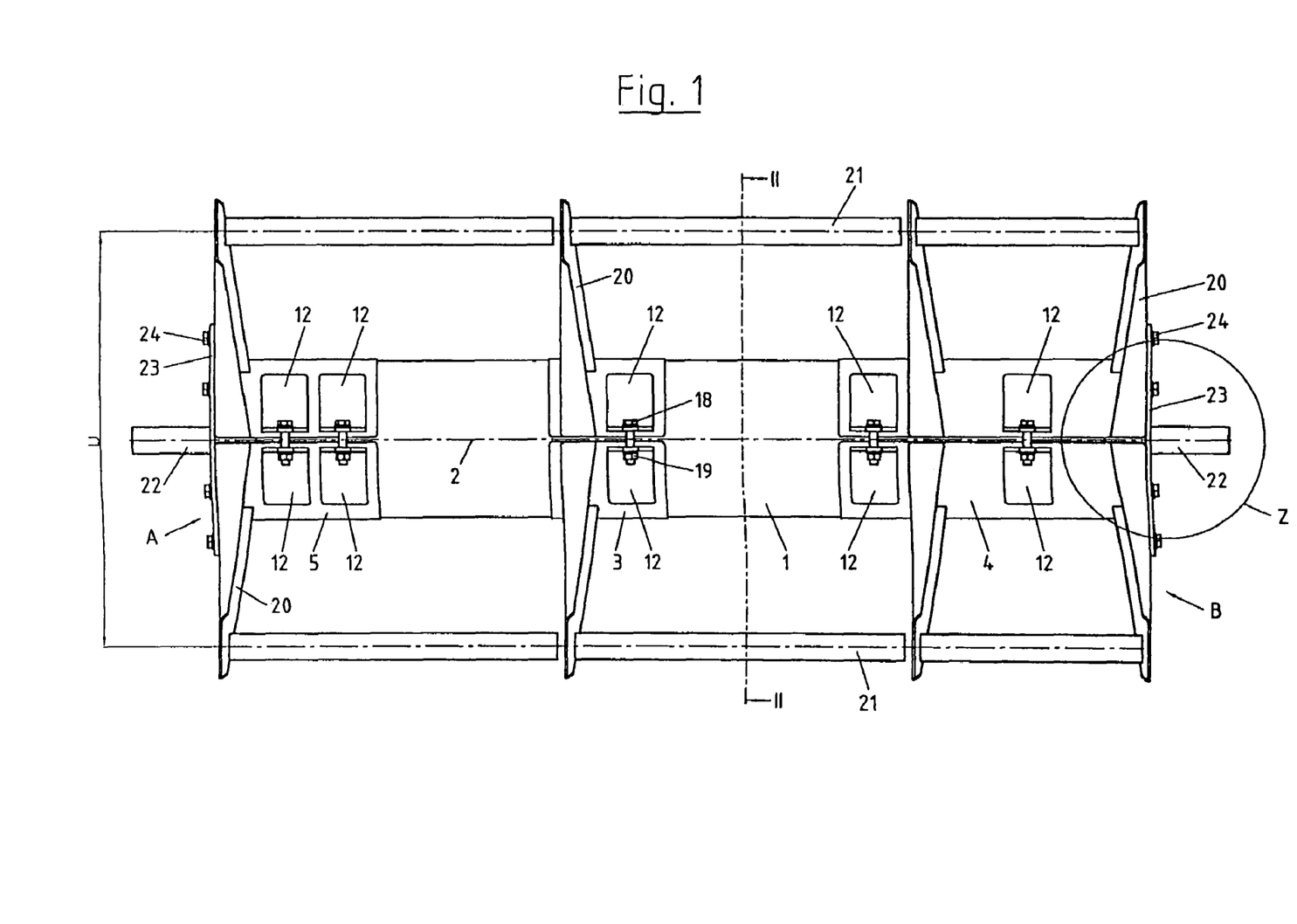
FIG. 1 is a schematical side view of a reel with a first embodiment of the attachment of the support elements on a clamping unit with a clamping sleeve.
Figure 2:
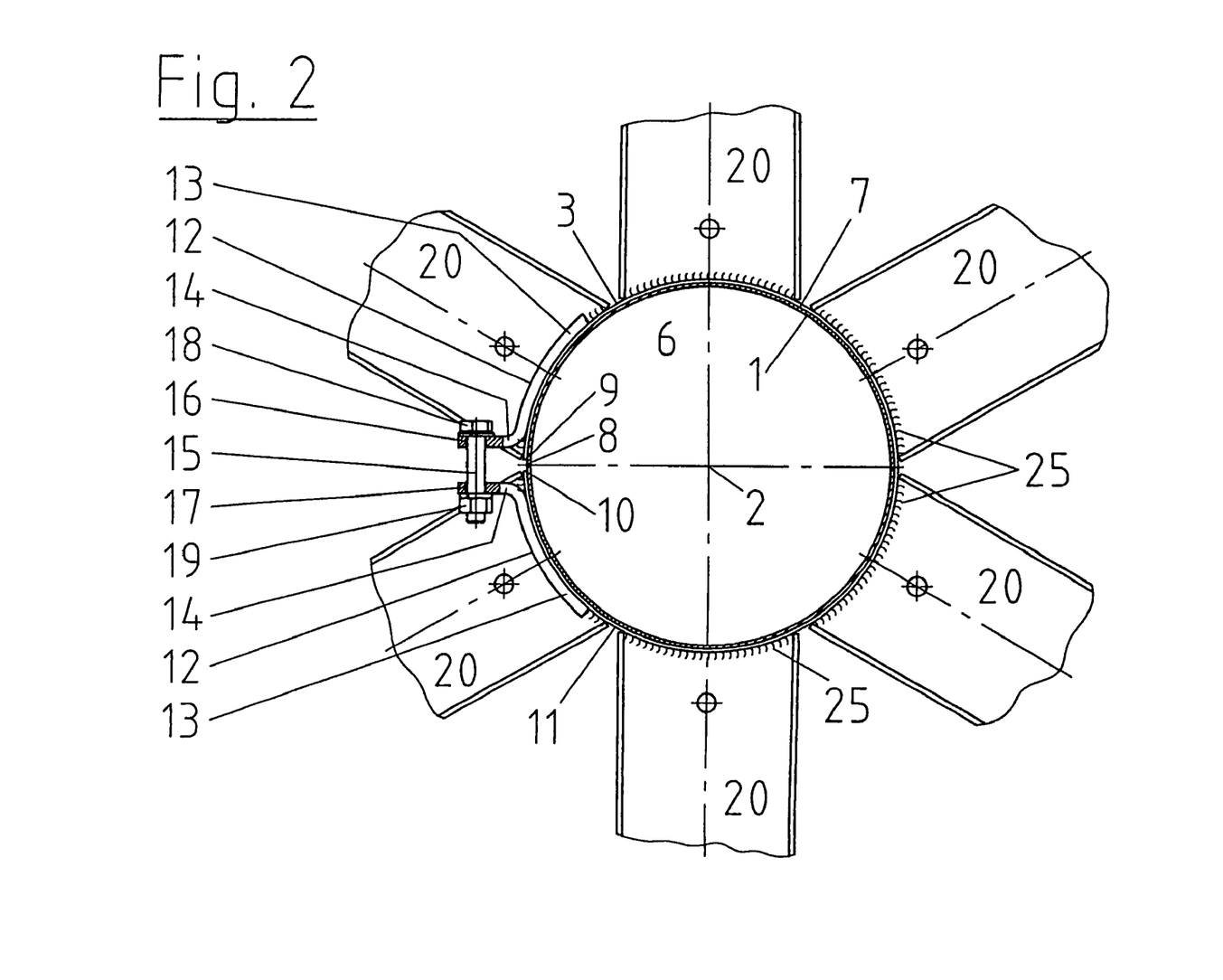
FIG. 2 is a sectional view along line II-II of FIG. 1.
Figure 5:
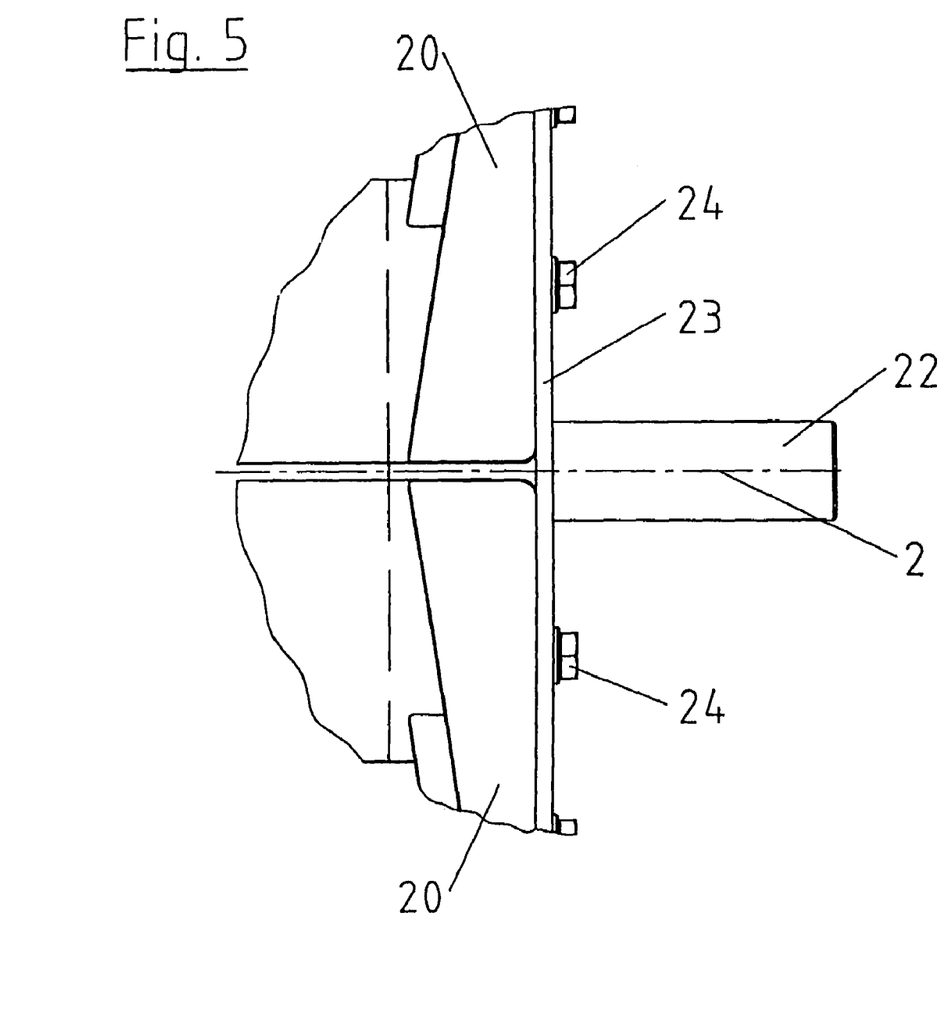
FIG. 5 is a schematic detail view of circle Z of FIG. 1 with reference to the attachment of the bearing journal.

FIGS. 1, 2 and 5 illustrate a reel with a single continuous carrier body 1 in the form of a thin-walled tube. The tube extends over a predetermined length, dimensioned correspondingly to the width of the reel, between the first end A and the second end B. The tube defines a longitudinal axis 2, representing also the rotational axis of the reel.

Clamping units with clamping sleeves 3, 4, 5 are mounted and distanced to each other along the longitudinal axis 2. The clamping sleeve 3 is described in reference to its structure and arrangement to the carrier body 1 in detail in FIG. 2. The clamping sleeve 3 encloses, via its inner face 6, the outer face 7 of the carrier body 1, formed as a circular cylindrical tube. The clamping sleeve 3 is formed with a slot. It is not formed as a continuous (closed) ring, but is represented as a ring slotted at one position. The slot is designated with the reference numeral 8 and extends in the embodiment parallel to the longitudinal axis 2. Thus, the clamping sleeve 3 has a first circumferential end 9 and a second circumferential end 10. The two circumferential ends 9, 10 are arranged to oppose one another while maintaining the slot 8.

The clamping unit has a lug 12. The lug 12 is attached towards the first circumferential end 9 on the outer face 11 of the clamping sleeve 3 by its first lug portion 13. The connection can, preferably, be represented by a welding connection. The lug 12 has a second lug portion 14. The second lug portion 14 is bent in relation to the first lug portion 13. The second lug portion 14 has a through bore 16 centred on the axis 15. The axis 15 perpendicularly intersects the longitudinal axis 2 at a distance thereto. The clamping unit further comprises, a further or second lug 12, formed in the same way as described for the lug 12 and arranged on the second circumferential end 10 and connected also to the outer face 11 of the clamping sleeve 3 by a welding connection. A second lug portion 14 is bent relative to the first lug portion 13. The second lug portion 14 also has a through bore 16 centred on the axis 15. The two lugs 12 are arranged so that the second lug portions 14 oppose each other. A clamping screw 18 is passed with its shaft through the through bores 16, 17. The clamping screw 18, as well, belongs to the clamping unit. The screw 18 has a head. The shaft end, projecting from the second lug portion 14 of the other lug 12, has a thread which receives a nut 19. By tightening the nut 19 on the clamping screw 18, the clamping sleeve 3 can be clamped (tightened) onto the carrier body 1 and is fixed frictionally on the same. Instead of a clamping screw 18, a multiplicity of clamping screws 18 can be arranged on the clamping sleeve 3. Here, the second lug portion 14 of the two lugs 12 have a corresponding number of pairs of through bores, respectively, accommodating the clamping screws.

In the present embodiment the slot 8 extends parallel to the longitudinal axis 2. However, also a different extension is possible. For example, an extension is possible, where the circumferential ends 9, 10 engage each other via projections. The projections enable guiding in the direction of the longitudinal axis 2 towards each other, however, they also enable an approximation or distancing away from each other in the circumferential direction around the longitudinal axis 2 on the outer face 7 of the carrier body 1. The second lug portions can be formed integrally with the clamping sleeve and can form a bent portion of the same.

In this embodiment, support elements 20 are provided in the form of arms projecting from the outer face 11 of the clamping sleeve 3. The arms are circumferentially distributed and extend in a radial direction. The arms 20 are welded to the clamping sleeve 3. The arms serve to support the tine carriers 21 on their radial outer ends. The tine carriers 21 are arranged circumferentially distributed on a circle with the diameter D around the longitudinal axis 2. In FIG. 1 further possibilities for the design and usage of clamping sleeves are represented.

The clamping sleeve 4 extends in relation to the clamping sleeve 3 over a larger length portion along the longitudinal axis 2. It has two pairs of lugs 12. At a radial distance to each other, support elements are arranged in a circumferentially distributed manner on the outer circumference of the clamping sleeve 4 in a similar manner as in the embodiment of FIG. 2. The slot extends over the complete axial length of the clamping sleeve 4. The clamping (tightening) is achieved via the two pairs of lugs 12 and respectively arranged clamping screws 18. Additionally, bearing journals 22, by interposition of a journal support flange 23, are arranged on the support elements 20, which are arranged towards the second axial end B. The reel is supported by the bearing journal 22 in the support arms of a cutter bar (not represented). As the clamping sleeve 4 is formed axially longer than the clamping sleeve 3, a larger axial positional adjustment on the outer face 7 of the carrier body 1 is possible. Thus, this longer length enables a compensation of tolerances or an adjustment to individual lengths starting from types of carrier bodies of set lengths for individual adaptation. Thus, with few components a larger variety of different reel types can be manufactured.

In a similar manner, clamping sleeve 5 is arranged on the first axial end A of the carrier body. The clamping sleeve 5 has a larger axial length along the longitudinal axis 2 than the first clamping sleeve 3. However, clamping sleeve 5 is formed correspondingly in its principal design similar to the first clamping sleeve 3. As described in the embodiment of the clamping sleeve 4, two lug pairs 12 are provided for tightening. On the second clamping sleeve 5, only one set of support elements is provided, as described with the design of FIG. 2 for the first clamping sleeve 3. The support elements 20, arranged to the clamping sleeve 5, also support a journal support flange 23 with a bearing journal 22. The journal support flange 23 is also fixed, via screws 24, to the support elements 20. In the same manner as for the clamping sleeve 4, an axial adjustment along the longitudinal axis 2 on the outer face 7 of the carrier body 1 is possible, to carry out length adjustments.

The attachment of the journal support flange 23, by means of screws 24, and the arrangement of the bearing journal 22 to the journal support flange 23 is especially visible in FIG. 5. An arrangement, as described in connection with the clamping sleeve 5 can be especially advantageous if, via a drive, a rotational movement is introduced into the reel to start rotating the same around the longitudinal axis 2. Since the clamping sleeve 5 is formed longer than the clamping sleeve 3, with two lug pairs 12 and clamping (tensioning) screws, a higher frictional attachment can be achieved onto the outer face 7 of the carrier body 1, than is the case with the clamping sleeve 3.

Figure 3:
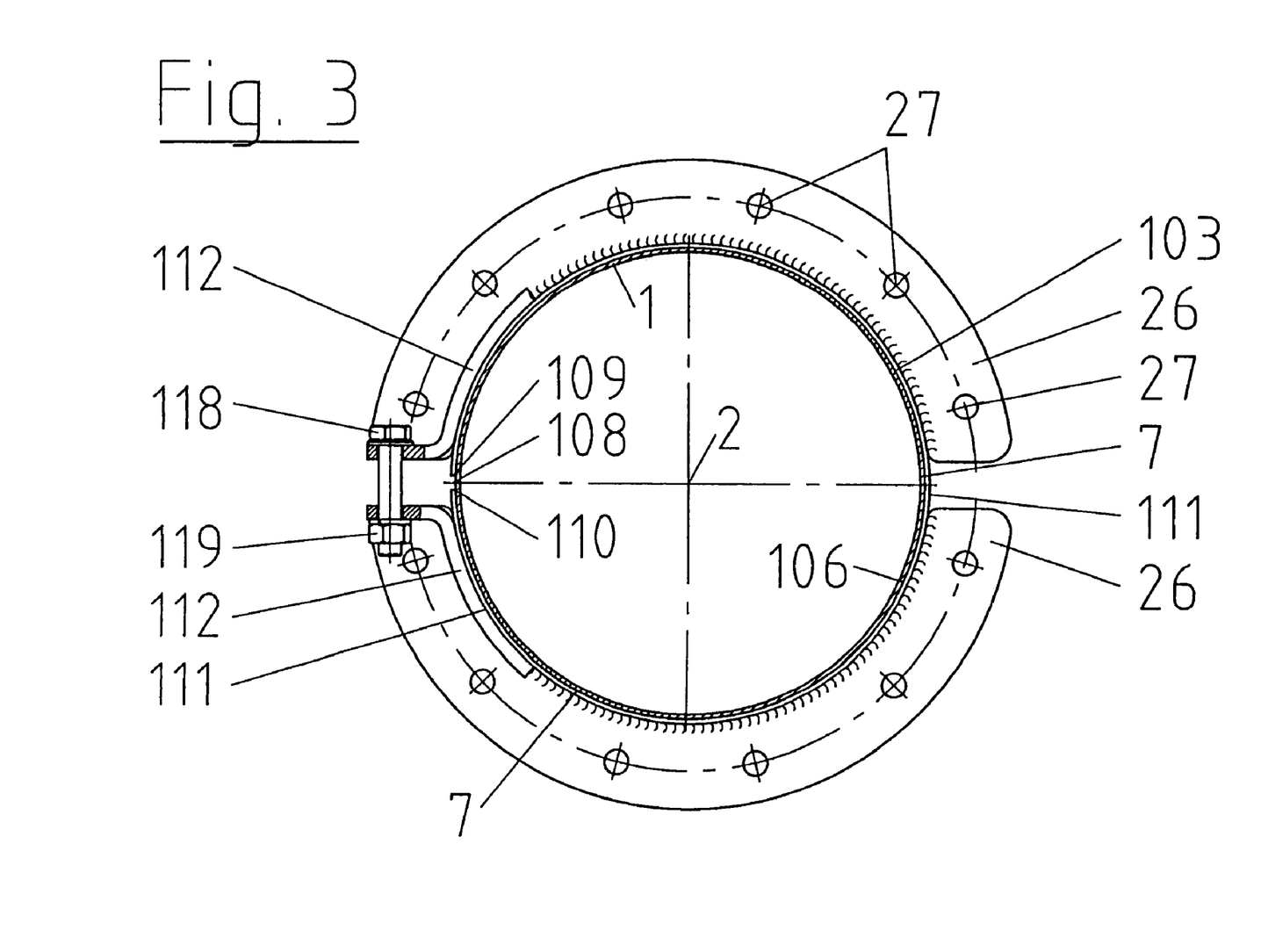
FIG. 3 is a cross-sectional view, similar to FIG. 2, with reference to a tubular carrier body, with a different embodiment of the clamping unit with a clamping sleeve.

FIG. 3 shows a further embodiment of a clamping unit. A clamping sleeve 103 has a basic design corresponding to that of the clamping unit with clamping sleeve 3. Components, corresponding to this clamping sleeve 3, are provided with reference numerals increased by the numerical value 100 compared to those described in connection with FIGS. 1, 2 and 5. To prevent repetition, reference is made to the description of these components in connection with FIG. 2. The difference to the embodiment of the clamping sleeve 3 is that, on the circumference, two flange-like attachment portions 26 are provided. The two flange-like attachment portions 26 have through bores 27 to attach support elements, which are not represented, by screws. The two flange-like attachment portions 26 extend, respectively, with a circumferential angle of less than 180° around the outer face 111 of the clamping sleeve 103. The attachment portions 26 are connected via a welding connection to the clamping sleeve 103. It is, however, also possible, that these are formed integrally with the cylindrical part of the clamping sleeve 103 forming a collar which is interrupted at two positions to enable tightening.

Instead of clamping screws 118 with a head, passed through two through bores, it is also possible, to provide a stud bolt. The stud bolt has only one threaded shaft fixed to a second lug of one of the lugs 112 and passed through a through bore in the other lug 112, so that a nut 119 can be screwed thereon.

Figure 4:
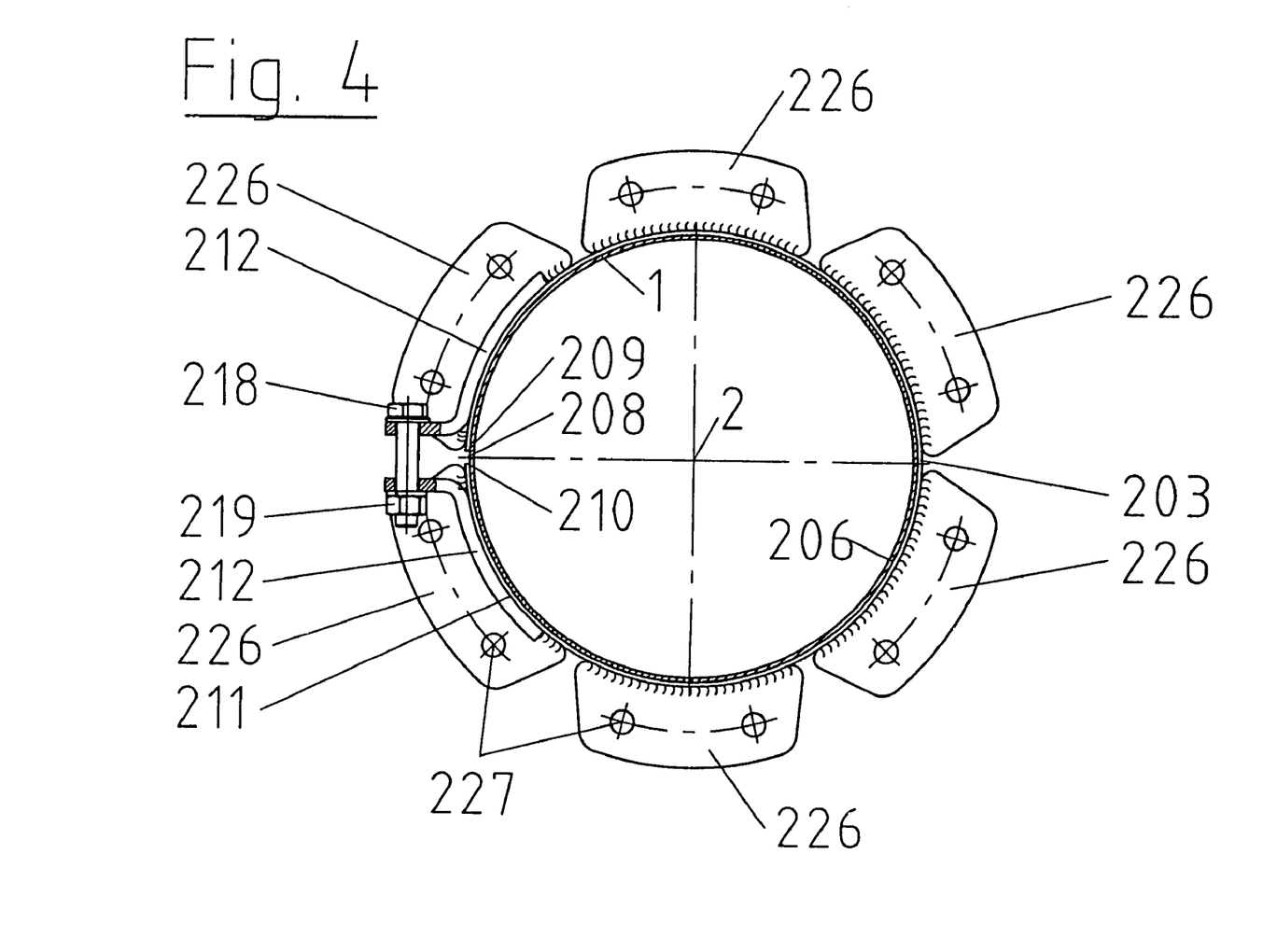
FIG. 4 is a cross-sectional view of a further embodiment of the clamping unit with a clamping sleeve arranged to a cylindrical carrier tube.

FIG. 4 shows a third embodiment of a clamping unit. Components, already described in connection with FIGS. 1 and 2 as well as 3, are provided with reference numerals increased by the numerical value 200. The only difference to the embodiment of FIG. 3 is that instead of two nearly semi-circular annular attachment portions 26 a multitude of attachment portions 226 is provided. The attachment portions 226 extend over a shorter circumferential area of the clamping sleeve 203 and have, respectively, for example, only an attachment for one support element 2 through bore 227.

Figure 6:
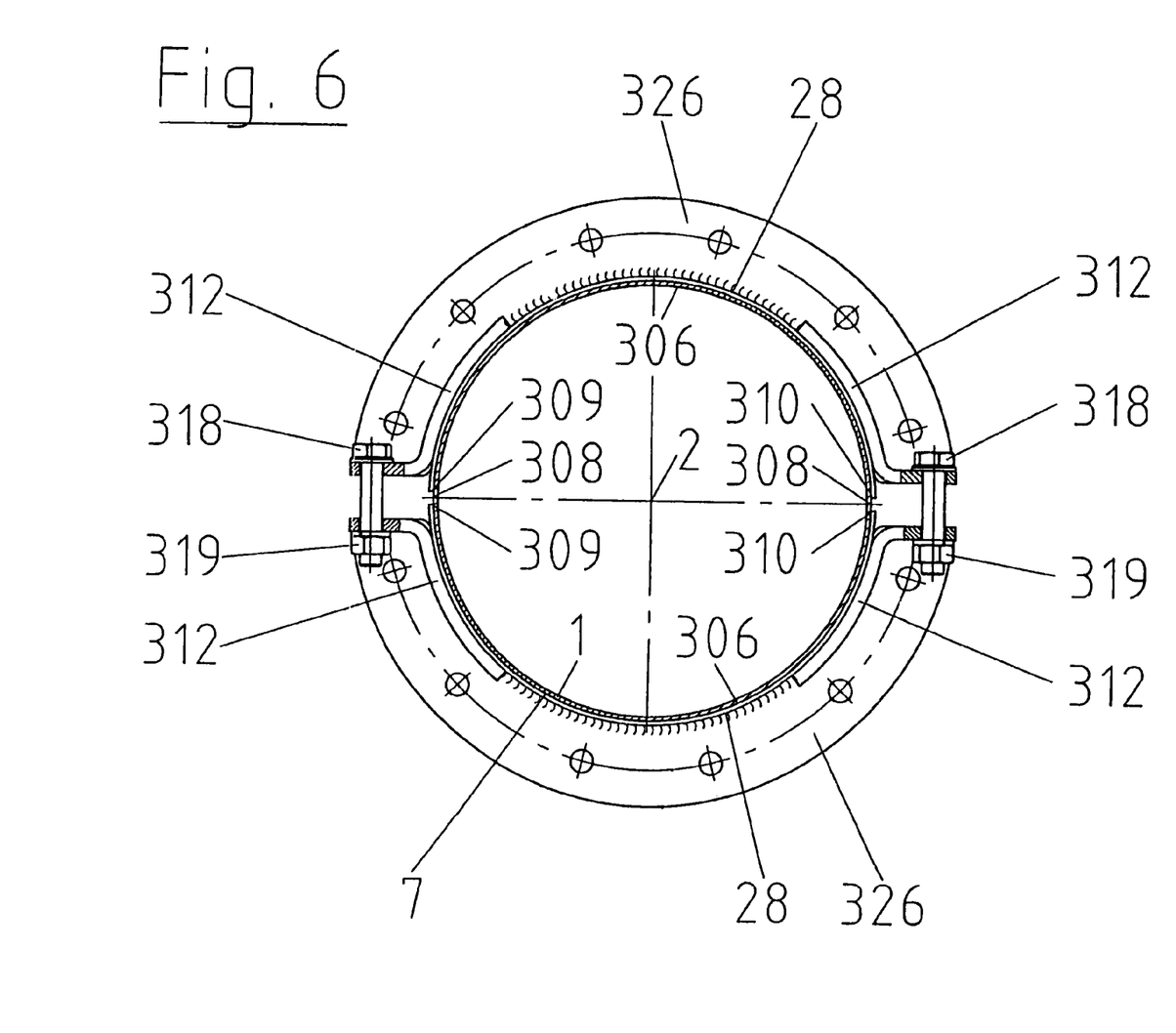
FIG. 6 is a cross-sectional view, similar to FIG. 2, however, with reference to a second embodiment according to the invention with a clamping unit with clamping segments.

FIG. 6 illustrate a further embodiment of a clamping unit. Two clamping segments 28 extend, respectively, over a circumference of less than 180° with reference to the outer face 7 of the tubular carrier body 1. The two clamping segments 28, respectively, are frictionally engaged by leaving a slot 308 between its circumferential ends 309 or 310, respectively, on the outer face 7. These clamping segments have, respectively, an attachment portion 326 which is welded to the portion adapted to the outer face 7. This attachment portion is provided with through bores 327, on which, respectively, a portion or some support elements can be mounted by means of a screw connection. The two clamping segments 28 form a ring which are connected via lugs 312. Two lug portions are bent outwardly. Screws are passed through the through bores of the same and are pressed against the outer face 7 of the carrier body 1.

The advantage of this embodiment is, that the clamping unit can be mounted with the two clamping segments 28 radially on the carrier body. Thus, a later exchange of a clamping unit, which is arranged between further clamping units along the longitudinal axis of the carrier body 1, can take place without the need, that the others or at least some of the other clamping units have to be demounted. This is for example the case in the embodiments of FIGS. 1 to 5, which axially, in the direction along the longitudinal axis have to be pushed onto the carrier body 1 or have to be pulled off the same, respectively.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cutting system reel of a harvesting machine comprising:
   a central carrier body defining a longitudinal axis and having an outer face extending over a length corresponding to the reel width between a first axial end and a second axial end, said first and second axial end connected to the harvesting machine;
   a multiplicity of support elements are distanced from each other along the longitudinal axis on the carrier body;
   the support elements support tine carriers that are distributed on a circle around the longitudinal axis, said tine carries support tines mounted adjacent to the cutting system;
   two first clamping units each including a split clamping sleeve enclosing at least partially the outer face of the carrier body in the circumferential direction and a clamping mechanism associated with the clamping sleeve to frictionally clamp the clamping sleeve on the outer face of the central carrier body and the two first clamping units each coupled with a bearing trunnion centered on the longitudinal axis, one of the first clamping units to be fixed on the first axial end of the carrier body and the other of the first clamping units fixed on the second axial end of the carrier body, a plurality of second clamping units distributedly arranged between the two first clamping units, said plurality of second clamping units each having a clamping sleeve and clamping mechanism which enable independent positioning each of said plurality of second clamping units in multiple positions along the longitudinal axis of said central carrier body between said two first clamping units when not being clamped on said outer face, said first and second clamping units each supporting, respectively, at least one support element of said multiplicity of support elements and said tine carriers being commonly supported by said support elements of said second clamping units and said support elements of said first clamping units.

2. The reel according to claim 1, wherein the carrier body is a tube having a circular cylindrical cross-section.

3. The reel according to claim 1, wherein the support elements are detachably mounted on the clamping units.

4. The reel according to claim 1, wherein the support elements are non-detachably connected to the corresponding clamping unit.

5. The reel according to claim 1, further comprising the bearing trunnion arranged to the clamping unit or the support element connected to a clamping unit to mount close to one of the axial ends of the carrier body.

6. The reel according to claim 1, said clamping units comprising, respectively, a clamping sleeve with an inner face adapted to the outer face of the carrier body enclosing the outer face in the circumferential direction, a slot splitting said clamping sleeve, said clamping sleeve having a first circumferential end and a second circumferential end delimiting the slot, and a clamping segment arranged to each clamping sleeve, the clamping segment engaging close to the first circumferential end and the second circumferential end, and said clamping sleeve can be clamped against the outer face of the carrier body.

7. The reel according to claim 1, wherein the clamping units, respectively, comprising clamping segments having inner faces adapted to the outer face of the carrier body and enclose the outer face in the circumferential direction and defining a slot with circumferential ends delimiting the slots, a portion of at least one support element is mounted on said clamping segments; a clamping mechanism coupled with the clamping segments for engaging the clamping segments close to the circumferential ends and enabling the clamping segments to be clamped against the outer face of the carrier body, the clamping segments, forming a ring.

8. The reel according to claim 6, wherein each clamping sleeve and each clamping segment have at least two projecting attachment portions extending radially from the longitudinal axis and extending, respectively, over a partial circumference of the clamping sleeve or over the circumference of the clamping segments, the attachment portions having through bores extending circumferentially distributed parallel to the longitudinal axis or having studs with threads for attaching a support element or a portion of the same.

9. The reel according to claim 6, wherein bent lugs are arranged close to the circumferential ends, which bent lug portions are arranged to oppose each other and have, respectively, at least one through bore for passing through a clamping screw.

10. The reel according to claim 7, wherein each clamping sleeve and each clamping segment have at least two projecting attachment portions extending radially from the longitudinal axis and extending, respectively, over a partial circumference of the clamping sleeve or over the circumference of the clamping segments, the attachment portions having through bores extending circumferentially distributed parallel to the longitudinal axis or having studs with threads for attaching a support element or a portion of the same.

11. The reel according to claim 7, wherein bent lugs are arranged close to the circumferential ends, which bent lug portions are arranged to oppose each other and have, respectively, at least one through bore for passing through a clamping screw.

* * * * *